United States Patent
Griswold et al.

(10) Patent No.: US 9,787,613 B2
(45) Date of Patent: Oct. 10, 2017

(54) DECOUPLED PACKET AND DATA PROCESSING RATES IN SWITCH DEVICES

(71) Applicant: AVAGO TECHNOLOGIES GENERAL IP (SINGAPORE) PTE. LTD., Singapore (SG)

(72) Inventors: Mark David Griswold, Fremont, CA (US); Michael Hei-Lung Lau, Rockville, MD (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/755,485

(22) Filed: Jun. 30, 2015

(65) Prior Publication Data
US 2016/0366073 A1  Dec. 15, 2016

Related U.S. Application Data

(60) Provisional application No. 62/172,847, filed on Jun. 9, 2015, provisional application No. 62/186,056, filed on Jun. 29, 2015.

(51) Int. Cl.
| | |
|---|---|
| H04L 12/28 | (2006.01) |
| H04L 12/861 | (2013.01) |
| H04L 12/935 | (2013.01) |
| H04L 12/873 | (2013.01) |

(52) U.S. Cl.
CPC ...... H04L 49/9057 (2013.01); H04L 49/3072 (2013.01); H04L 49/9042 (2013.01); H04L 47/52 (2013.01)

(58) Field of Classification Search
None
See application file for complete search history.

(56) References Cited

U.S. PATENT DOCUMENTS

| | | |
|---|---|---|
| 5,191,578 A | 3/1993 | Lee |
| 5,828,608 A | 10/1998 | Nguyen et al. |
| 6,097,239 A | 8/2000 | Miranda, Jr. et al. |
| 6,871,346 B1 | 3/2005 | Kumbalimutt et al. |
| 7,006,489 B2 | 2/2006 | Li et al. |
| 2007/0195773 A1* | 8/2007 | Tatar ............... H04L 49/1546 370/392 |
| 2011/0010481 A1* | 1/2011 | Hamadani ......... G06F 13/4022 710/313 |
| 2013/0070588 A1* | 3/2013 | Steele ............... H04L 49/90 370/230 |

(Continued)

*Primary Examiner* — Phirin Sam
(74) *Attorney, Agent, or Firm* — Oblon, McClelland, Maier & Neustadt, L.L.P.

(57) ABSTRACT

Continuing to integrate more aggregate bandwidth and higher radix into switch devices is an economic imperative because it creates value both for the supplier and customer in large data center environments which are an increasingly important part of the marketplace. While new silicon processes continue to shrink transistor and other chip feature dimensions, process technology cannot be relied upon as a key driver of power reduction. Transitioning from 28 nm to 16 nm is a special case where FinFET provides additional power scaling, but subsequent FinFET nodes are not expected to deliver as substantial of power reductions to meet the desired increases in integration. The disclosed switch architecture attacks the power consumption problem by controlling the rate at which power-consuming activities occur.

19 Claims, 7 Drawing Sheets

(56) References Cited

U.S. PATENT DOCUMENTS

| | | |
|---|---|---|
| 2013/0114413 A1 | 5/2013 | Song et al. |
| 2014/0056307 A1* | 2/2014 | Hutchison ............ H04L 49/552 |
| | | 370/394 |
| 2014/0376557 A1 | 12/2014 | Park et al. |

* cited by examiner

DECOUPLED PACKET AND DATA PROCESSING RATES IN SWITCH DEVICES

PRIORITY CLAIM

This application claims priority to provisional application Ser. No. 62/186,056, filed Jun. 29, 2015 and to provisional application Ser. No. 62/172,847, filed Jun. 9, 2015, which are entirely incorporated by reference.

TECHNICAL FIELD

This disclosure relates to packet processing in switch devices. This disclosure also relates to decoupling packet and data processing rates in switch devices.

BACKGROUND

High speed data networks form part of the backbone of what has become indispensable worldwide data connectivity. Within the data networks, network devices, such as switching devices, direct data packets from source ports to destination ports, helping to eventually guide the data packets from a source to a destination. Improvements in packet processing will further enhance the capabilities of network switching devices.

DETAILED DESCRIPTION

Continuing to integrate more aggregate bandwidth and higher radix into switch devices creates value both for the supplier and customer in large data center environments, which are an increasingly important part of the marketplace. While new silicon processes continue to shrink transistor and other chip feature dimensions, process technology cannot be relied upon as a key driver of power reduction. Transitioning from 28 nm to 16 nm is a particular case where Field Effect Transistor (FET) structures such as FinFETs, provides additional power scaling, but subsequent FinFET nodes are not expected to deliver as substantial of power reductions to meet the desired increases in integration.

The disclosed switch architecture provides a solution to the power consumption problem by controlling the rate at which power-consuming activities occur. The switch architecture helps to achieve very significant power savings compared to existing switch architectures. In turn, the architecture allows for higher bandwidth switches, in part because the architecture provides the thermal feasibility that would otherwise be an important limiting factor for high-end datacenter switches.

Figure 1:
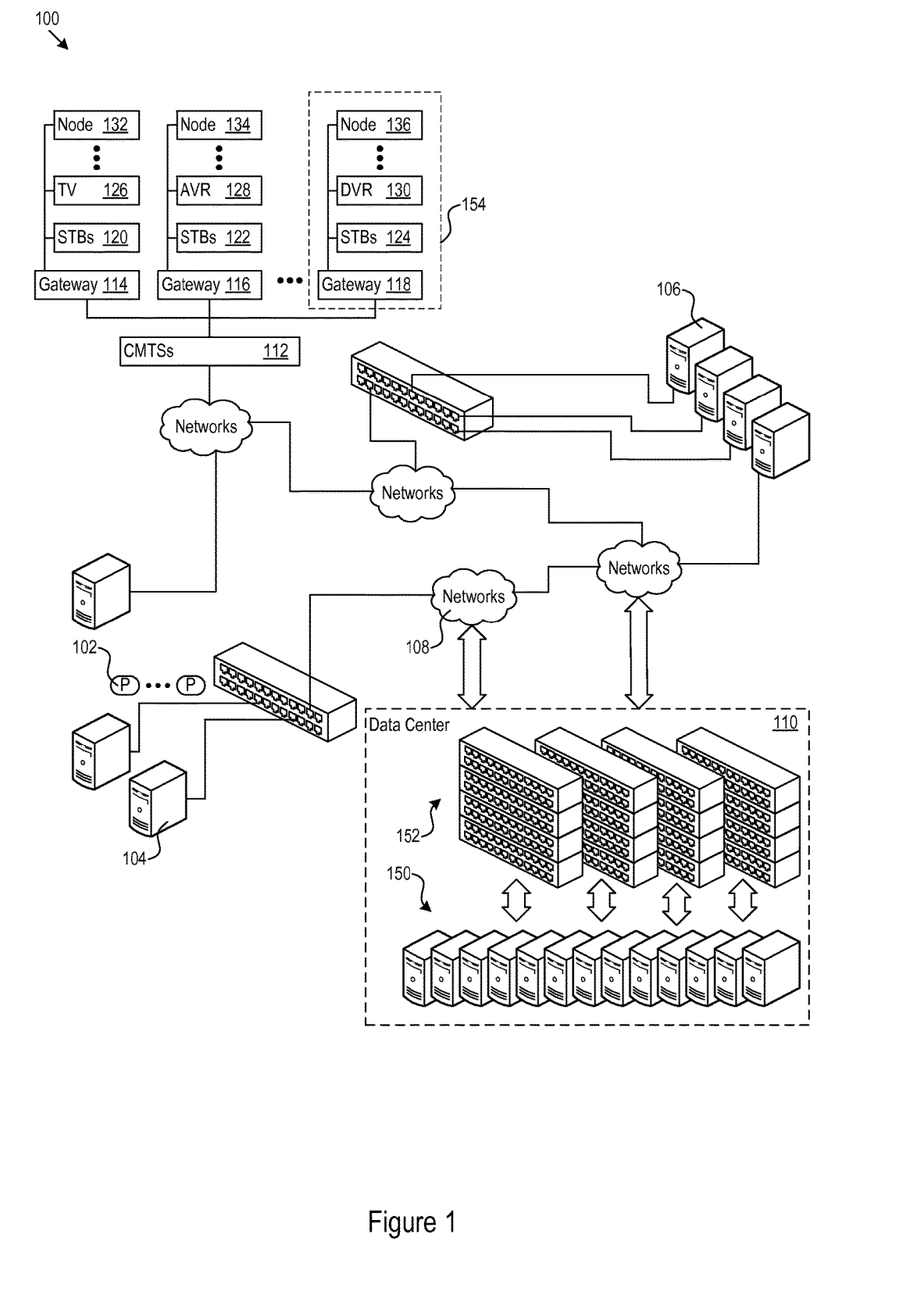
FIG. 1 shows an example of a network that includes network devices such as switches.

To provide some context for the discussion below, FIG. 1 shows an example network 100. In the network 100, network devices route packets (e.g., the packet 102) from sources (e.g., the source 104) to destinations (e.g., the destination 106) across any number and type of networks (e.g., the Ethernet/TCP/IP protocol network 108). The networking devices may take many different forms and may be present in any number. The network 100 may span multiple routers and switches, for instance. Examples of network devices include switches, bridges, routers, and hubs; however other types of networking devices may also be present throughout the network 100.

The network 100 is not limited to any particular implementation or geographic scope. As just a few examples, the network 100 may represent a private company-wide intranet; a wide-area distribution network for cable or satellite television, Internet access, and audio and video streaming; or a global network (e.g., the Internet) of smaller interconnected networks. The data center 110 may represent a highly concentrated server installation 150 with attendant network switch and router connectivity 152. The data center 110 may support extremely high volume e-commerce, search engines, cloud storage and cloud services, streaming video or audio services, or any other types of functionality.

In the example in FIG. 1, the network 100 includes operators and providers of cable or satellite television services, telephony services, and Internet services. In that regard, for instance, FIG. 1 shows that the network 100 may include any number of cable modem termination system (CMTSs) 112. The CMTSs 112 may provide service to any number of gateways, e.g., the gateways 114, 116, 118. The gateways may represent cable modems, combined cable modems and wireless routers, or other types of entry point systems into any of a wide variety of locations 154, such as homes, offices, schools, and government buildings. The network 100 may include other types of termination systems and gateways. For example, the network 100 may include digital subscriber line (DSL) termination systems and DSL modems that function as the entry points into homes, offices, or other locations.

At any given location, the gateway may connect to any number of any type of node. In the example of FIG. 1, the nodes include set top boxes (STBs), e.g., the STBs 120, 122, 124. Other examples of nodes include network connected smart TVs 126, audio/video receivers 128, digital video recorders (DVRs) 130, streaming media players 132, gaming systems 134, computer systems 136, and physical media (e.g., BluRay) players. The nodes may represent any type of customer premises equipment (CPE).

Power efficiency is an important goal throughout the network 100. The data centers 110 may in particular consume very significant amounts of energy in order to fulfil their role of switching, at high speeds, extremely large volumes of traffic to their appropriate destinations. However great the power consumption in the data centers may be, the power consumption in other locations is also important. For instance, it would not be uncommon for any of the locations 154 to include network switches in large numbers. Although perhaps more distributed, the total power consumption of switches elsewhere in the network 100 is also significant.

Figure 2:
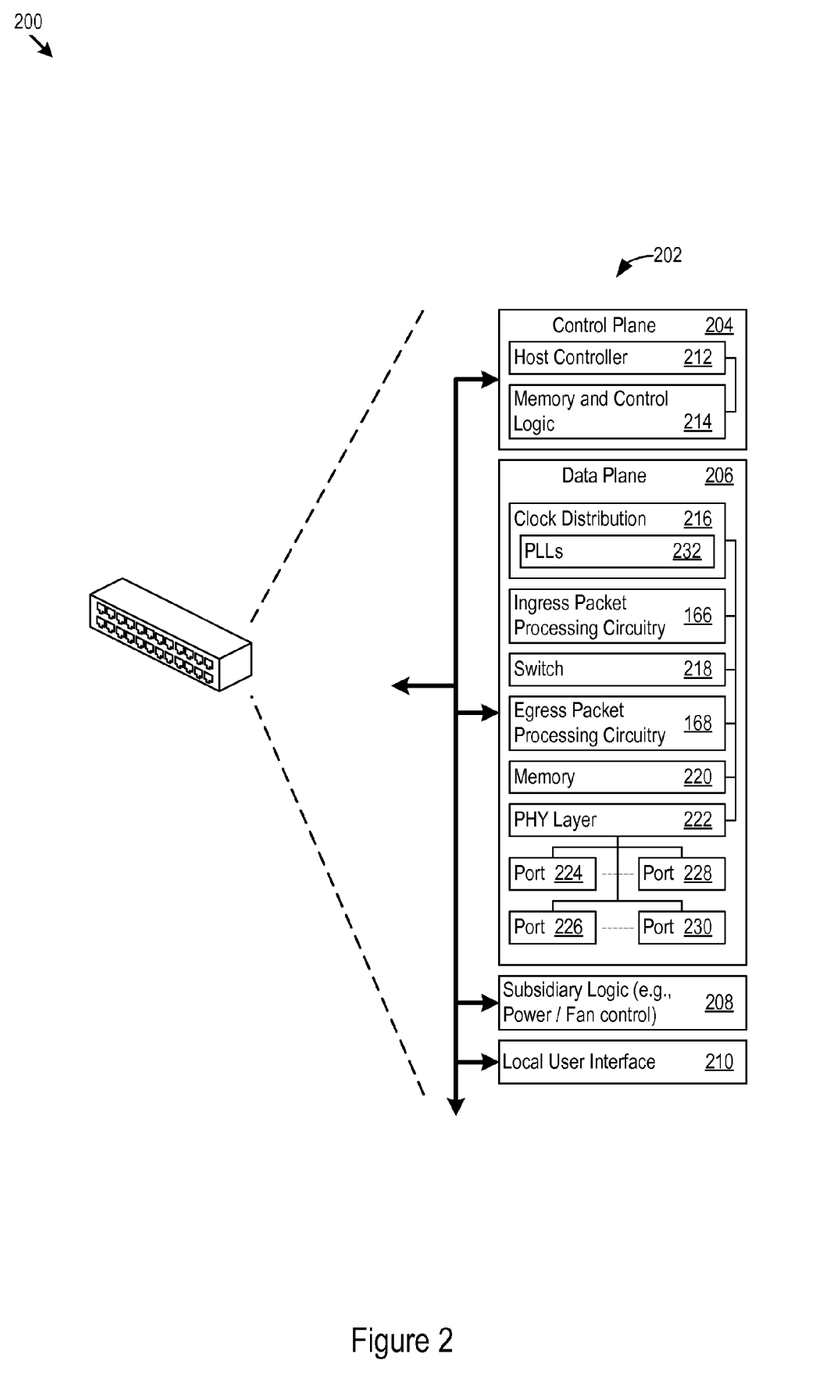
FIG. 2 shows an example switch architecture.

As further context, FIG. 2 shows a switch architecture 200. The switch architecture 200 generally includes system logic 202 divided into a control plane 204, a data plane 206, subsidiary logic 208, and a local user interface 210. The control plane 204 may include one or more host controllers 212 in communication with memory and control logic 214. Just as one example, the memory and control logic 214 may store instructions executed by the host controller 212 to implement overall control, configuration, and other desired functionality in the switch architecture 200.

The subsidiary logic 208 may control specific subsystems in the switch architecture 200. As examples, the subsidiary logic 208 may control fans, power supplies, or other systems. The local user interface 210 may accept configuration input and output via any indicator, display, annunciator, text based or graphical user interface.

The data plane 206 may include a clock distribution tree 216 for providing clock signals throughout the data plane 206, a switch fabric 218 for switching data packets, and data memory 220 for buffering packets and other data on ingress or egress. The data plane 206 may also include a Physical (PHY) layer 222 that transmits and receives packets through one or more ports (e.g., the Ethernet ports 224, 226, 228, and 230). The local user interface 210 may accept clock commands that the control plane 204 or data plane 206 processes to, for instance, set clock speeds for any clock domain within the switch architecture 200. Responsive to the clock commands, the control plane 204 or data plane 206 may set, e.g., inputs and parameters for phase locked loops (PLLs) 232, or any other clock generation logic, to change the speed of clocks delivered to ingress packet processing circuitry 166, egress packet processing circuitry 168, or both.

Figure 3:
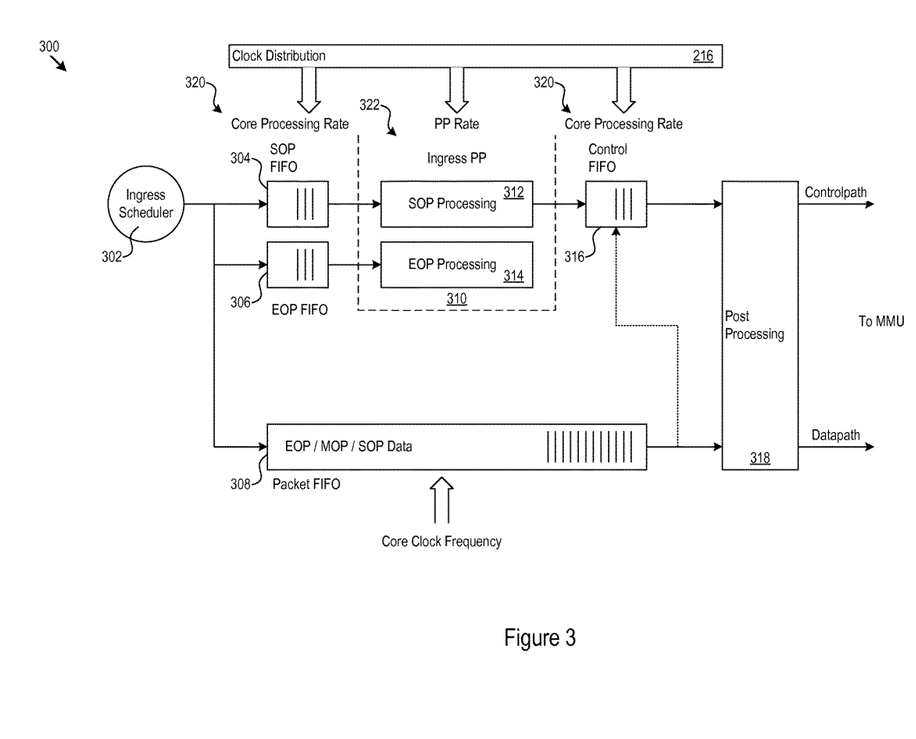
FIG. 3 shows an example of an ingress switch architecture for decoupled packet processing on the ingress.

FIG. 3 shows an example of a switch architecture 300 for decoupled packet processing rates on the ingress. The switch architecture 300 includes an ingress scheduler 302 that provides packet data, e.g., in the form of start of packet (SOP) and end of packet (EOP) cells, to a packet processing SOP FIFO 304, and a packet processing EOP FIFO 306, respectively. The SOP FIFO 304 and EOP FIFO 306 may be organized on a per-source port basis. The ingress scheduler 302 also provides the SOP cells, middle of packet (MOP) cells, and the EOP cells (the data for the whole packet) to a packet FIFO 308.

Packet processing circuitry 310 executes specific processing operations on the packet data. The packet processing circuitry may include SOP processing circuitry 312 and EOP processing circuitry 314. Decisions made by the SOP processing circuitry 312 result in SOP control data saved in the control FIFO 316. The control data is matched up with SOP cells flowing out of the packet FIFO 318, and both are provided to the post processing circuitry 318 and then onto the memory management unit (MMU) or switch fabric to be switched to egress ports after execution of the post processing circuitry 318. In that regard, the packet FIFO 308 implements a parallel path with regard to the processing through the SOP FIFO 304, SOP processing circuitry 312, and the control FIFO 316. The post processing circuitry 318 may perform many different operations, such as adding, deleting, or modifying packet headers.

The switch architecture 300 defines multiple different processing domains. In FIG. 3, one processing domain is the core processing domain 320. A second processing domain is the ingress packet processing domain 322. The core processing domain 320 includes, in this example, the SOP FIFO 304 and EOP FIFO 306, the control FIFO 316, and post processing circuitry 318. The ingress packet processing domain 322 encompasses the packet processing circuitry 310, including the SOP processing circuitry 312 and the EOP processing circuitry 314. The different processing domains may operate at different rates. In one implementation, the rates differ according to the clock speeds set for the processing domains. For example, the ingress packet processing domain 322 may operate at a slower clock frequency than the core clock frequency, and thereby save significant power as compared to running the packet processing circuitry 310 at the core clock frequency.

Figure 6:
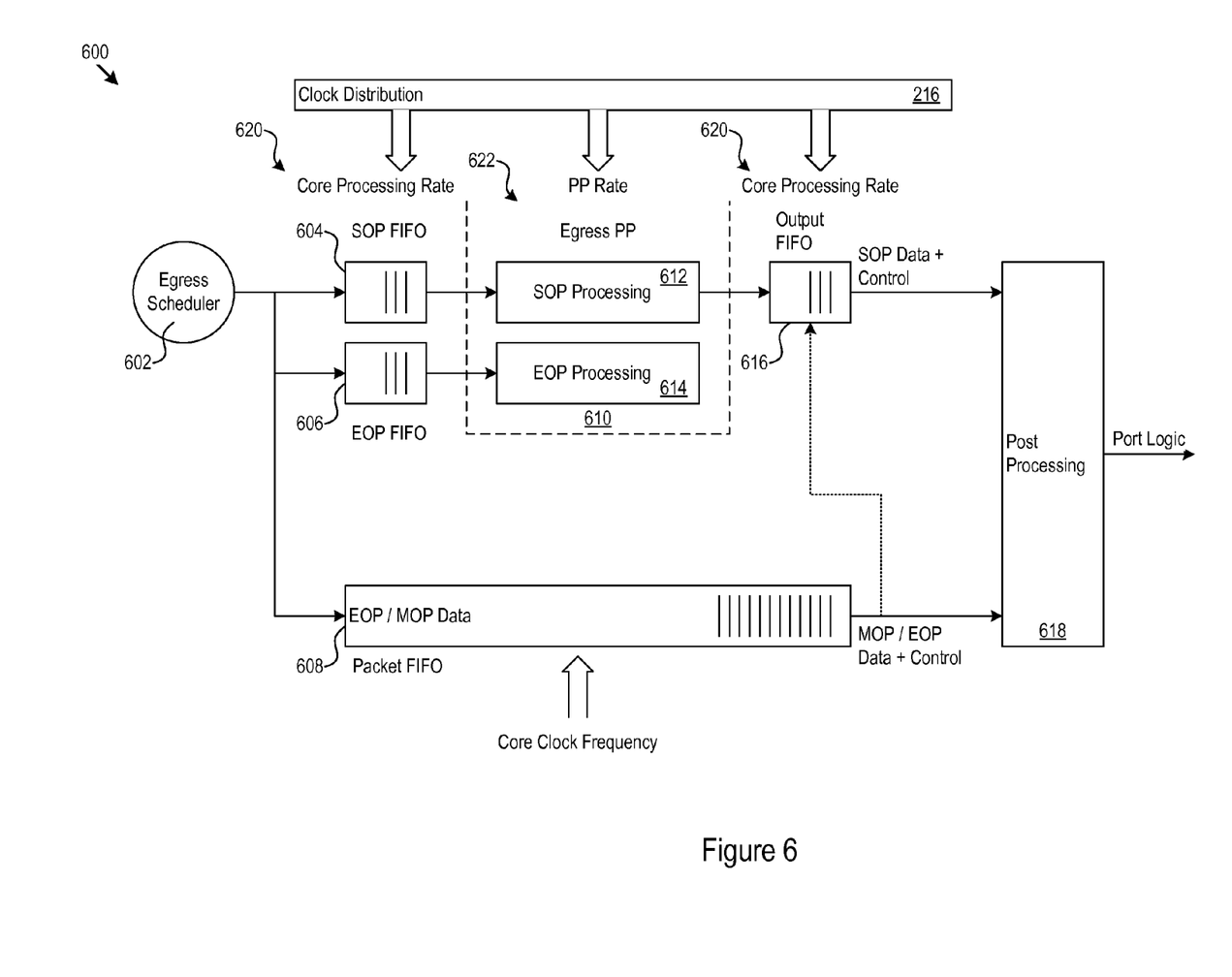
FIG. 6 shows an example of an egress switch architecture for decoupled packet processing on the egress.

Note that in both the switch architecture 300 (for ingress) and the switch architecture 600 (for egress) and different processing rates for different domains may be implemented through mechanisms other than variation in clock speed, or in combination with variation clock speed. Note also that the partitioning of the switch architecture 300 into different domains may be done in many different ways to encompass any particular type of processing. In the example described in more detail below, the packet processing domains 322 and 622 encompass packet processing circuitry that, when executing at a slower rate than other processing domains, will save significant power.

Upon arrival, the switch divides packets into fixed sized cells. As just one example, the cell size may be 208 bytes. The first cell is the SOP cell, which holds the SOP data from the packet. The SOP cell may contain 144 bytes of packet data and include 64 bytes of overhead information. Subsequent cells may use all 208 bytes in the cell to carry packet data. The ingress packet processing domain 322 performs processing on the SOP cell for the entire packet. That is, decisions for the packet are made on the SOP cell for the packet, including destination and priority decisions. Once made, the subsequent cells of the packet are subject to the same decisions. Given the very significant bandwidth supported by the switch, the majority of the power consumption comes from the processing done by the ingress packet processing domain 322, including lookups, classifications, and other header processing that the SOP processing circuitry 312 performs on each SOP cell. The EOP processing circuitry 314 also consumes power by processing EOP cells to perform, as examples, metering, bookkeeping, counter updates, and other packet statistics functions.

The EOP cell carries the final data from the packet. The remaining cells are MOP cells. The ingress circuitry responsible for dividing packets into cells provides flags forward to the ingress scheduler 302 to identify SOP cells, MOP cells, and EOP cells. For instance, the serializer/deserializer (SERDES) blocks in the media access control (MAC) layer may signal SOP/EOP forward to the ingress scheduler 302 (e.g., as status bits in overhead information). Again, this is just one of many examples of how the switch may implement a division of packets into cells for processing. When a packet fits into one cell, then the switch architecture 300 may insert the cell into both the SOP FIFO 304 and the EOP FIFO 306, as that one cell represents both the first and last cell of the packet.

A worst case (though generally unrealistic) scenario for traffic is that all incoming packets are small enough to fit into a single cell. In that case, the packet processing rate in the ingress packet processing domain 322 would need to be set and maintained so that the packet processing rate is sufficient to meet the line rate in order to keep up with incoming traffic. As will be described in more detail below, the packet processing rate for the ingress packet processing domain 322 is set independently from the core processing domain 320, and may be much lower than would be required to guarantee processing packets at line rate for the worst case scenario. For instance, the processing rate for ingress packet processing domain may be set to ⅔ or ½ or any other fraction of the rate of the core processing domain 320. Significant power savings is one result, e.g., reducing power consumption from 300 W to 200 W in some cases, and by 60 W to 100 W in many other implementations.

The architecture described below trades off performance on single cell packets in order to gain significant power savings. Real-world traffic is rarely made up of all small packets that fit into one cell. Although variations may be expected based on customer, application, and other factors, in many cases the traffic mix pattern shows less than 50% small packets.

Per-port buffers at the input of the switch provide oversubscription buffers to absorb bursts of small, one cell, packets. When those buffers fill to beyond a threshold level, the switch may signal flow control back to the network to request backoff. In other implementations, e.g., where the switch is configured for lossy traffic, the switch may instead drop the packets.

Figure 7:
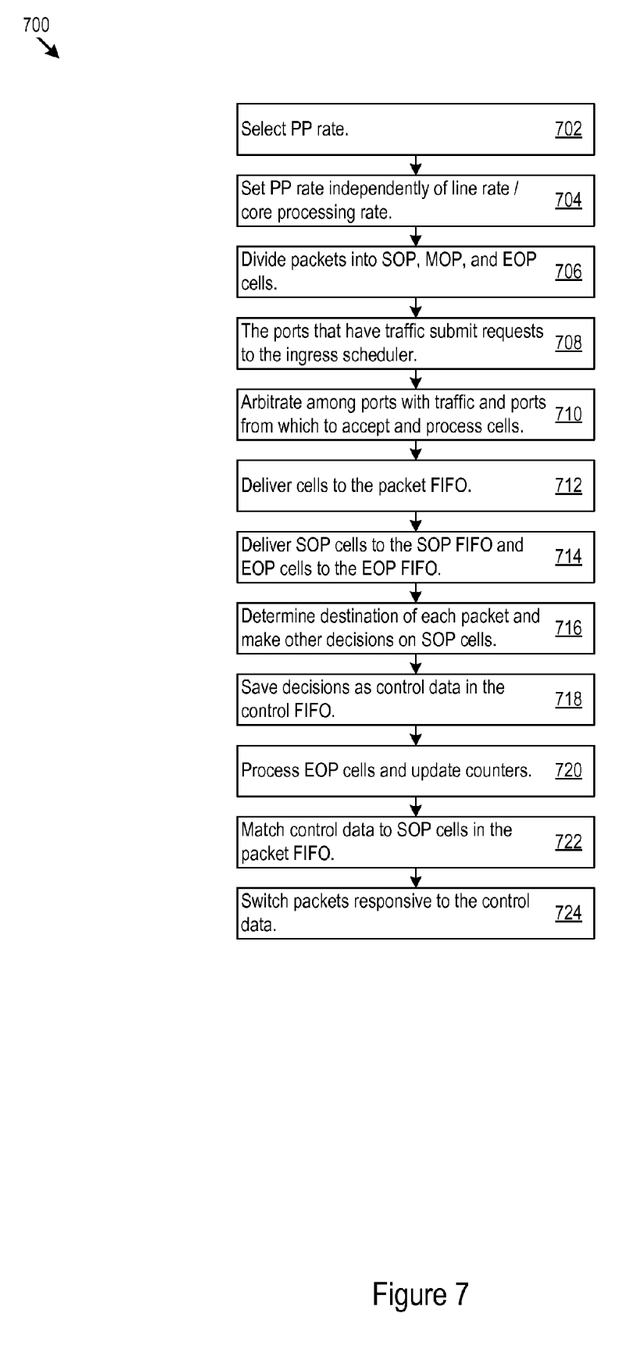
FIG. 7 shows example logic for decoupled packet processing.

A description of decoupled packet and cell processing follows, with reference to again to FIG. 3 and also FIG. 7. FIG. 7 shows example logic 700 that a device may implement for decoupled packet processing. The logic determines the packet processing rate (702). The packet processing rate may be set independently of the core processing rate (704), e.g., by adjusting PLL outputs that drive all or part of the clock distribution 216 to set different clock speeds and thus different processing rates. The device may thereby decouple packet and data processing rates, and consume less power than would otherwise be consumed to, e.g., guarantee meeting line rate under a worst case scenario.

Incoming packets received at the various ports are divided into cells, including SOP, EOP, and MOP cells (706). The ports that have traffic submit requests to the ingress scheduler 302 (708), which arbitrates among them and chooses ports from which to accept and process cells (710).

The ingress scheduler 302 delivers each cell to the packet FIFO 308 (712). The ingress scheduler 302 also delivers the SOP cells to the SOP FIFO 304 and delivers the EOP cells to the EOP FIFO 306 (714). The ingress scheduler 302 will be discussed in more detail below, and manages both the packet rate going through the ingress packet processing domain 322 (which may be running at a lower rate) and the cell rate through the packet FIFO 308 (which may be running at the core processing rate). The ingress scheduler 302 is both packet aware and cell aware.

The SOP processing circuitry 312, among other decisions, may determine the destination of each packet (716). The destination decision, and other decisions made on the SOP cells, are represented by control data that the SOP processing circuitry 312 saves in the control FIFO 316 (718). The EOP processing circuitry 314 analyzes the EOP cells and may update counters or take other bookkeeping actions (720).

The control data in the control FIFO 316 is matched to SOP cells in the packet FIFO 308 (722). The memory management unit (MMU) switches packets to their destinations, e.g., specific egress ports, responsive to the control data (724). For instance, the MMU may deliver packet cells to the destination FIFO queue for the determined destination port.

In some implementations, the ingress scheduler 302 sends EOP cells from a given source port in the same cycle as it sends an SOP cell for the same source port for the next packet. That is, there is a parallelism enforced, with both the EOP cell and SOP cell coming from the same source port, and in which the EOP cell is sent along with the SOP cell of a subsequent packet. If there is a new SOP cell saved in the SOP FIFO 304 and the EOP FIFO 306 already has an EOP cell for that source port, then both the SOP cell and EOP cell may enter the ingress packet processing domain 322 together.

Each cell of the packet enters the packet FIFO 308, including the SOP cells. As such, when an SOP cell emerges from the packet FIFO 308, the respective control data for that SOP cell is available at the control FIFO 316. The MOP and EOP cells follow the SOP cell out of the packet FIFO 308, and are switched according to the control data for the associated SOP cell.

Figure 4:
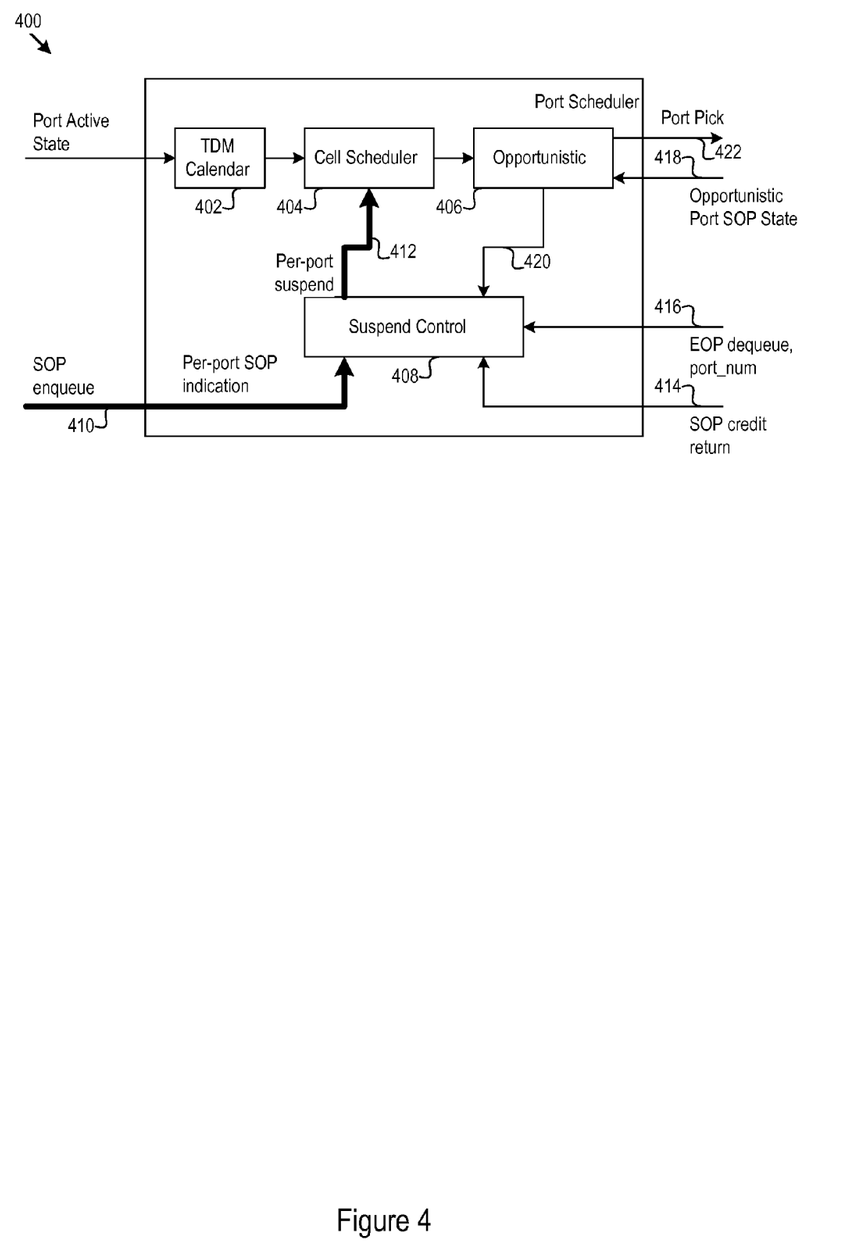
FIG. 4 shows an example of port scheduling circuitry for decoupled packet processing on the ingress.

FIG. 4 shows an example of port scheduling circuitry 400 for decoupled packet processing rates on the ingress. In particular, the port scheduling circuitry 400 may implement the ingress scheduler 302. The port scheduling circuitry 400 is aware of both packets and cells, and may manage packet selections for source ports and cell selections for source ports. The port scheduling circuitry 400 manages the bandwidth down the packet processing pipeline for the SOP cells and non-SOP cells.

In the example of FIG. 4, the port scheduling circuitry 400 includes TDM calendar circuitry 402, cell scheduler circuitry 404, and opportunistic selection circuitry 406. The port scheduling circuitry 400 also includes suspend control circuitry 408. The calendar circuitry 402 may, for instance, reserve a fixed number of slots in time for specific ports. The calendar circuitry 402 may be active when the switch is operating at full line rate. The cell scheduler circuitry 404 ultimately decides which port gets a time division multiplex slot to process a packet, as specified on the port pick output 422.

The SOP input 410 provides a per-port indication to the suspend control circuitry 408 of whether an SOP cell is ready at any given ingress port. The suspend control circuitry 408 provides a per-port suspend output 412 to the cell scheduler circuitry 404. With the packet processing rate running slower than line rate, packet processing bandwidth becomes a potentially scarce resource. The suspend control circuitry 408 qualifies and disqualifies ports from participating in cell processing responsive to whether the suspend control circuitry 408 determines when a given port is allowed to start a new packet being processed through the switch.

The suspend control circuitry 408 knows which ports have a new packet to process as specified by the SOP input 410, which may be provided from upstream call assembly circuitry. In one design, the suspend control circuitry 408 makes qualification and disqualification decisions responsive to available bandwidth credits. The SOP credit return input 414 signals when an SOP cell has left the SOP FIFO 304 and entered the SOP processing circuitry 312. Accordingly, the suspend control circuitry 408 tracks when the SOP FIFO 304 has room to accept more SOP cells.

The suspend control circuitry 408 also tracks which ports are requesting service (via the SOP input 410), and the suspend control circuitry 408 will grant those ports to start a new packet when bandwidth credits are available. In one design, after the suspend control circuitry 408 grants a port for a new packet, the suspend control circuitry 408 may continue granting and consuming credits for that port until the EOP cell is reached, as indicated by the EOP dequeue input 416. When insufficient bandwidth credits are available, the suspend control circuitry 408 holds ports and keeps them suspended in the cell scheduler circuitry 404, so that only ports that have already started packets may continue to send MOP cells and EOP cells. As bandwidth credits arrive, the suspend control circuitry 408 will unsuspended ports so that they may have their packets processed.

The suspend control circuitry 408 unsuspends a port when it has been granted to start a new packet. That is, participation into the cell scheduler circuitry 404 is on a packet-by-packet basis. Once the suspend control circuitry 408 has granted a port to send a new packet, the suspend control circuitry 408 also tracks when the packet has finished. In response, the suspend control circuitry 408 resuspends the port (when all of its granted packets have been processed) until the suspend control circuitry 408 grants the port again. In that regard, the suspend control circuitry 408 may grant multiple SOPs to a port, even if a particular packet has not yet finished.

The opportunistic input 418 to the opportunistic selection circuitry 406 provides additional scheduling options. In some cases, e.g., when traffic is light, and bandwidth credits are available (e.g., above a credit threshold), the opportunistic selection circuitry 406 requests bandwidth in the packet processing pipeline for sources that do not directly participate in port scheduling. Examples of such sources include CPU ports and internal management ports. The opportunistic output 420 informs the suspend control circuitry 408 when it has consumed bandwidth credits for opportunistic traffic.

Figure 5:
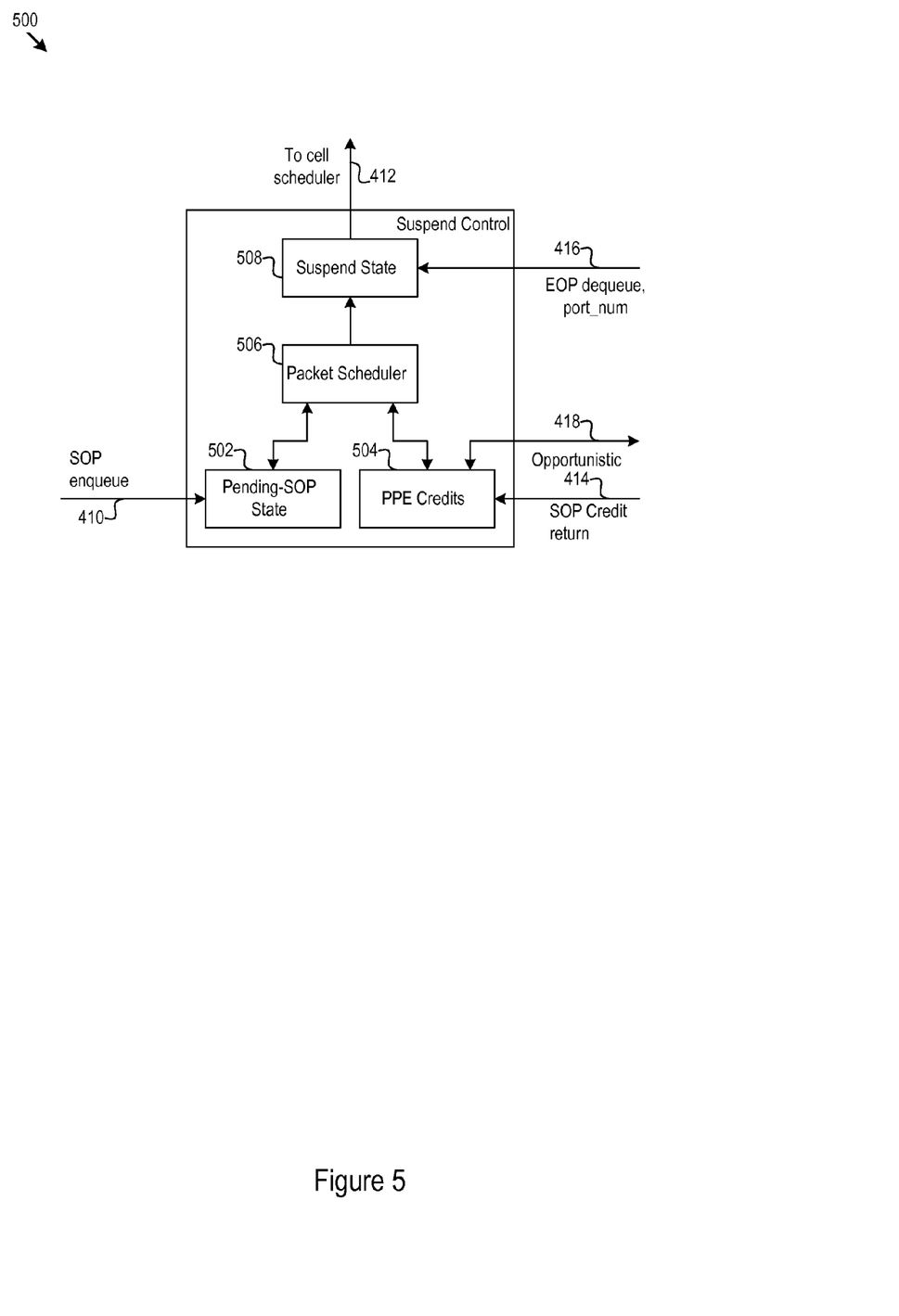
FIG. 5 shows an example of suspend/control logic for decoupled packet processing on the ingress.

FIG. 5 shows an example implementation 500 of suspend control circuitry 408 for decoupled packet processing rates on the ingress. The implementation 500 includes SOP state registers 502 that track how many SOP cells each port has ready to send. The implementation also includes a bandwidth credit counter 504 that tracks how much space is available in the SOP FIFO 304 for new SOP cells.

The packet scheduler circuitry 506 selects ports with SOP cells ready, as long as there are credits available. The packet scheduler circuitry 506 also makes selections based on port rate. For instance, the packet scheduler circuitry 506 may schedule a 100 Gb port four times as often as a 25 Gb port, each having new packets ready for processing.

The suspend state circuitry 508 tracks which ports are granted and which are suspended and provides the grant/suspend status to the cell scheduler circuitry 404. In some implementations, the packet scheduler circuitry 506 suspends a port from starting a new packet, after that port has been granted. The port may remain suspended for new packets until the EOP indication has come back for that packet, e.g., via the EOP dequeue input 416. By default, the suspend state circuitry 508 may keep ports suspended. Once a port has an SOP cell granted for a new packet, that port tends to receive available cell bandwidth to push the remaining packet cells through the processing pipeline. That is, the suspend control circuitry 408 does not typically suspend a packet once it has started. Thus, as bandwidth credits return to the suspend control circuitry 408, the bandwidth credits tend to be allocated to ports with in-progress packets.

FIG. 6 shows an example of a switch architecture 600 for decoupled packet processing rates on the egress. Like the switch architecture 300 in FIG. 3, the switch architecture 600 defines different processing domains. In particular, the switch architecture 600 may use a slower processing rate for the packet processing circuitry 610, as compared to the faster processing rate used elsewhere.

The switch architecture 600 includes an egress scheduler 602 that provides packet data, e.g., in the form of start of packet (SOP) and end of packet (EOP) cells, to a packet processing SOP FIFO 604, and a packet processing EOP FIFO 606, respectively. The SOP FIFO 604 and EOP FIFO 606 may be organized on a per-destination port basis. The egress scheduler 602 also provides the SOP cells, middle of packet (MOP) cells, and the EOP cells to a packet FIFO 608.

Packet processing circuitry 610 executes specific processing operations on the packet data before the packet are transmitted out of the switch. The packet processing circuitry may include SOP processing circuitry 612 and EOP processing circuitry 614. Decisions made by the SOP processing circuitry 612 result in SOP control data saved in the output FIFO 616.

Note that in the architecture 600, the SOP cells also flow through the SOP processing circuitry 612 into the output FIFO 616. The SOP processing circuitry 612 performs, as examples, encapsulation and decapsulation on the packets, removing headers, adding headers, processing multi-path packets, and looking-up next hop addresses, among other processing actions. The EOP processing circuitry 614 may perform meter updates and counter updates responsive to the EOP cells, among other actions. The control data and SOP cells are matched up with EOP and MOP cells and flowing out of the packet FIFO 608. The cells flow to the post processing circuitry 618 which may perform other packet processing actions on the cells.

As noted above, the egress switch architecture 600 defines multiple different processing domains. In FIG. 6, one processing domain is the core processing domain 620. A second processing domain is the egress packet processing domain 622. The egress packet processing domain 622 may operate at a rate different than the ingress packet processing domain 322, and different than the core processing rate. For instance, the ingress packet processing rate 322 may be one-third of the core processing rate, and the egress packet processing rate may be one-half of the core processing rate.

The core processing domain 620 includes, in this example, the SOP FIFO 604 and EOP FIFO 606, the output FIFO 616, the packet FIFO 608, and post processing circuitry 618. The egress packet processing domain 622 encompasses the packet processing circuitry 610, including the SOP processing circuitry 612 and the EOP processing circuitry 614. Again, the different processing domains may run at different processing rates. In particular, the egress packet processing domain 622 may operate at a slower rate than the core processing rate, and thereby save additional power as compared to running the packet processing circuitry 610 at the core processing rate.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method comprising:
within a switch architecture:
establishing, within the switch architecture, multiple processing domains each encompassing different processing circuitry within the switch architecture, the multiple processing domains including:
a first processing domain having a core processing rate; and
a packet processing domain having a packet processing rate that can be selectively configured to be slower than the core processing rate,
wherein the first processing domain includes a packet first-in-first-out (FIFO) memory that forms a data path parallel for packets portions of which are processed by circuitry within the packet processing domain.

2. The method of claim 1, further comprising:
providing, within the packet processing domain, start-of-packet (SOP) processing circuitry.

3. The method of claim 2, further comprising:
determining, with the SOP processing circuitry, control information for an SOP cell; and
providing the control information to a control FIFO in the first processing domain.

4. The method of claim 1, further comprising:
providing, within the packet processing domain, end-of-packet (EOP) processing circuitry.

5. The method of claim 4, further comprising:
processing, with the EOP processing circuitry, an EOP cell; and
updating a counter responsive to processing the EOP cell.

6. The method of claim 4, further comprising:
receiving, for a specific packet, an EOP cell; and
storing the EOP cell in an EOP memory in the first processing domain, prior to the EOP processing circuitry.

7. The method of claim 1, further comprising:
receiving, for a specific packet, a start-of-packet (SOP) cell, an end-of-packet (EOP) cell, and a middle-of-packet (MOP) cell;
storing the SOP cell in an SOP memory in the first processing domain, prior to the packet processing domain; and
storing the EOP cell in an EOP memory in the first processing domain, prior to the packet processing domain.

8. The method of claim 7, further comprising:
storing the SOP cell, the MOP cell, and the EOP cell in the packet FIFO memory in the first processing domain.

9. The method of claim 8, further comprising:
processing the SOP cell through SOP processing circuitry in the packet processing domain to determine control information for the SOP cell; and
storing the control information in a control memory in the first processing domain after the SOP processing circuitry.

10. The method of claim 9, further comprising:
matching the control information to the SOP cell when it exits the packet FIFO memory.

11. A system comprising:
first processing domain circuitry running at a first processing rate, and comprising at least:
a start-of-packet (SOP) memory,
an end-of-packet (EOP) memory, and
a control memory; and
second processing domain circuitry configured to run at a second processing rate that can be configured to be slower than the first processing rate, the second processing domain circuitry comprising:
SOP processing circuitry configured to receive SOP cells from the SOP memory and output control data to the control memory, and
EOP processing circuitry configured to receive EOP cells from the EOP memory,
wherein the first processing domain includes a packet first-in-first-out (FIFO) memory that forms a data path parallel for packets portions of which are processed by circuitry within the second processing domain.

12. The system of claim 11, further comprising:
an ingress scheduler configured to suspend and grant ports that receive packets corresponding to the SOP cells and the EOP cells.

13. The system of claim 12, wherein the ingress scheduler comprises a per-port SOP enqueue input; and suspend control circuitry in communication with the SOP enqueue input, and configured to issue a per-port suspend signal responsive to the SOP enqueue input.

14. The system of claim 13, further comprising:
an SOP credit return input to the suspend control circuitry.

15. The system of claim 14, further comprising:
an EOP dequeue input to the suspend control circuitry.

16. The system of claim 11, wherein the packet FIFO memory is configured to receive the SOP cells, MOP cells, and EOP cells for packets processed by the system.

17. The system of claim 16, wherein the packet FIFO memory is configured to output the SOP cells aligned in time with their corresponding control data from the control memory as determined by the SOP processing circuitry.

18. A system comprising:
first processing domain circuitry running at a first processing rate, and comprising:
an ingress start-of-packet (SOP) first-in-first out (FIFO) memory,
an ingress end-of-packet (EOP) FIFO memory,
an ingress control FIFO memory, and
an ingress parallel packet FIFO memory implementing a parallel path for packets portions of which are provided to the ingress SOP FIFO memory and the ingress control FIFO memory;

second processing domain circuitry configured to run at a second processing rate that can be adjusted to be slower than the first processing rate, the second processing domain circuitry comprising:

ingress SOP processing circuitry configured to receive SOP cells from the ingress SOP FIFO memory and output ingress control data to the ingress control FIFO memory, and ingress EOP processing circuitry configured to receive EOP cells from the ingress EOP FIFO memory and process the EOP cells for bookkeeping; and an ingress scheduler configured to suspend and grant ports that receive packets corresponding to the SOP cells and the EOP cells, the ingress scheduler comprising:

a per-port SOP enqueue input, suspend control circuitry in communication with the SOP enqueue input, and configured to issue a per-port suspend signal responsive to the SOP enqueue input, an SOP credit return input to the suspend control circuitry, and an EOP dequeue input to the suspend control circuitry.

19. The system of claim 18, wherein the first clock domain circuitry further comprises:

an egress start-of-packet (SOP) first-in-first out (FIFO) memory, an egress end-of-packet (EOP) FIFO memory, an egress control FIFO memory; and an egress parallel packet FIFO memory implementing a parallel path with regard to the egress SOP FIFO memory and the egress control FIFO memory; and where the second clock domain circuitry further comprises:

egress SOP processing circuitry configured to receive SOP cells from the egress SOP FIFO memory and output egress control data to the egress control FIFO memory, and egress EOP processing circuitry configured to receive EOP cells from the egress EOP FIFO memory and process the EOP cells for bookkeeping.

* * * * *